(12) United States Patent
Rice et al.

(10) Patent No.: US 7,739,070 B2
(45) Date of Patent: Jun. 15, 2010

(54) STANDARDIZED INTERFACES FOR PROPRIETARY INSTRUMENTS

(75) Inventors: Thomas Ambler Rice, Olivehurst, CA (US); David William Grieve, Edinburgh (GB)

(73) Assignee: Agilent Technologies, Inc., Santa Clara, CA (US)

( * ) Notice: Subject to any disclaimer, the term of this patent is extended or adjusted under 35 U.S.C. 154(b) by 48 days.

(21) Appl. No.: 11/846,229

(22) Filed: Aug. 28, 2007

(65) Prior Publication Data

US 2009/0063082 A1 Mar. 5, 2009

(51) Int. Cl.
*G06F 19/00* (2006.01)
(52) U.S. Cl. .................. 702/123; 715/771
(58) Field of Classification Search .................. 700/89, 700/1, 9, 28, 79, 83, 86, 90; 715/748, 749, 715/773, 700, 764, 771; 73/865.8, 865.9; 324/73.1, 76.11, 76.12, 76.13, 76.19, 76.2, 324/76.21, 76.22, 76.38, 76.39, 76.52, 76.77, 324/500, 512, 519, 520, 521, 523, 527, 537, 324/754, 759, 761; 702/1, 57, 64, 66, 67, 702/75, 76, 79, 108, 117, 119, 121, 122, 702/123, 127, 187, 188, 189; 706/14; 709/208, 709/220, 221, 222, 230, 236; 710/1, 2, 15, 710/62, 63, 72; 713/1, 2, 100; 716/100, 716/120, 168, 174
See application file for complete search history.

(56) References Cited

U.S. PATENT DOCUMENTS

| | | | | | |
|---|---|---|---|---|---|
| 2,950,437 | A | * | 8/1960 | Stahl | 324/73.1 |
| 2,996,666 | A | * | 8/1961 | Shields | 324/73.1 |
| 3,082,374 | A | * | 3/1963 | Buuck | 324/73.1 |
| 3,219,927 | A | * | 11/1965 | Topp, Jr. et al. | 714/735 |
| 3,237,100 | A | * | 2/1966 | Chalfin et al. | 324/108 |
| 3,487,304 | A | * | 12/1969 | Kennedy | 324/73.1 |
| 3,522,532 | A | * | 8/1970 | Mccoy | 324/73.1 |
| 4,168,796 | A | * | 9/1979 | Fulks et al. | 714/734 |
| 4,194,113 | A | * | 3/1980 | Fulks et al. | 714/732 |
| 4,339,819 | A | * | 7/1982 | Jacobson | 714/734 |
| 4,500,993 | A | * | 2/1985 | Jacobson | 714/734 |
| 4,635,259 | A | * | 1/1987 | Schinabeck et al. | 714/734 |
| 4,637,020 | A | * | 1/1987 | Schinabeck | 714/736 |
| 4,646,299 | A | * | 2/1987 | Schinabeck et al. | 714/736 |
| 4,764,925 | A | * | 8/1988 | Grimes et al. | 714/743 |
| 5,412,575 | A | * | 5/1995 | Constant et al. | 705/400 |
| 5,481,463 | A | * | 1/1996 | Constant et al. | 705/400 |
| 5,581,463 | A | * | 12/1996 | Constant et al. | 705/400 |
| 6,014,033 | A | * | 1/2000 | Fitzgerald et al. | 324/765 |
| 6,041,363 | A | * | 3/2000 | Schaffer | 719/321 |

(Continued)

*Primary Examiner*—Edward R Cosimano

(57) ABSTRACT

A test instrument and method for operating the same are disclosed. The data acquisition system within the instrument generates signals and couples the signals to a device and/or receives signals from the device. The data processor within the instrument includes measurement specific software that generates measurements from the received signals, a restricted software application that utilizes the measurement data, and a physics API that interfaces the measurement specific software with the data acquisition system. The physics API provides a plurality of internal physics functions that are used by the measurement specific software to access the measurement data. The instrument includes an external API that maps the physics functions to an external set of physics functions that are available to the restricted software application and that hide the internal physics functions from the restricted software while providing access to a portion of the measurement data.

9 Claims, 2 Drawing Sheets

U.S. PATENT DOCUMENTS

| | | | |
|---|---|---|---|
| 6,096,094 A * | 8/2000 | Kay et al. | 717/168 |
| 6,476,628 B1 * | 11/2002 | LeColst | 324/765 |
| 6,539,522 B1 * | 3/2003 | Devins et al. | 716/5 |
| 6,741,947 B1 * | 5/2004 | Wichelman et al. | 702/122 |
| 6,745,145 B2 * | 6/2004 | Lara et al. | 702/121 |
| 6,823,283 B2 * | 11/2004 | Steger et al. | 702/127 |
| 6,876,942 B2 * | 4/2005 | Hagerott et al. | 702/120 |
| 6,943,576 B2 * | 9/2005 | Byun et al. | 324/765 |
| 7,340,745 B2 * | 3/2008 | Waldorf | 719/328 |
| 2002/0078266 A1 * | 6/2002 | Watanabe et al. | 710/8 |
| 2003/0155941 A1 * | 8/2003 | Byun et al. | 324/765 |
| 2003/0236644 A1 * | 12/2003 | Lara et al. | 702/121 |
| 2004/0054492 A1 * | 3/2004 | Hagerott et al. | 702/120 |
| 2004/0216139 A1 * | 10/2004 | Rhoda et al. | 719/320 |
| 2005/0038665 A1 * | 2/2005 | Hasebe | 705/1 |
| 2005/0262396 A1 * | 11/2005 | Woodward et al. | 714/30 |
| 2008/0161957 A1 * | 7/2008 | Rice et al. | 700/108 |
| 2009/0063709 A1 * | 3/2009 | Rice et al. | 710/1 |

* cited by examiner

STANDARDIZED INTERFACES FOR PROPRIETARY INSTRUMENTS

BACKGROUND OF THE INVENTION

Test instruments were originally compact stand-alone devices that performed physical measurements and displayed the results. For example, an oscilloscope measured the voltage as a function of time at a particular point in a circuit and displayed the result as a simple graph of voltage versus time. As the cost of computational hardware decreased, additional capabilities were incorporated into test instruments to provide increased computational and display capabilities. This new class of instruments typically includes a general-purpose computer that performs various calculations on the raw data or configuration parameters and provides more sophisticated data output capabilities including enhanced displays.

One class of test instruments is organized into three layers. At the lowest layer are the modules that actually generate the signals that are applied to the device under test (DUT) and measure signals received from that device. This layer will be referred to as the "physics" layer in the following discussion. These devices include RF signal generators, A/D and D/A converters, frequency converters, signal conditioners, digital signal processors (DSPs) and gate arrays. Many of these devices include software components that can be utilized to control the operation of the modules by appropriate calls to routines within the software. In some cases, the software itself can be augmented to provide new functions. The specific modules utilized in a particular instrument are sometimes provided by a vendor that is different from the vendor that provides the test instrument. Hence, the software at the module level can be more or less independent of the specific test instrument in which the module resides.

The second layer of software typically includes programs that transform the physical measurements provided by the physics layer into the basic measurements of interest. This layer of software will be referred to as the measurement layer in the following discussion. For example, a network analyzer typically measures the response of a DUT to an RF signal as a function of the frequency of the RF signal. The analyzer may include the RF signal generator, a local oscillator (LO) generator, and a mixer that down converts a signal received from the DUT to a base band determined by the LO signal. Finally the analyzer measures the amplitude and phase of the signal from the mixer as a function of frequency by causing the RF signal generator and LO generator to sweep through the desired range of frequency values. The measurement layer software controls the physics layer modules and software such that the modules generate the correct signals. The measurement layer software converts the raw measurements from the modules into the measurements of interest, i.e., the amplitude and phase of the signal from the DUT as a function of frequency.

The measurement layer routines are preferably independent of the specific modules that are used to generate and measure the signals that provide the final measurement. The lifetime of any particular module is limited, and hence, systems that can be altered by the replacement or addition of a new module without the need to rewrite a significant portion of the measurement layer routines have distinct advantages in terms of the cost of designing and maintaining a family of test instruments. Furthermore, a particular measurement layer application set may be useable in a number of different instruments based on different sets of physics level modules. Hence, to provide the desired level of independence, an application program interface (API) is provided between the physics layer and the measurement layer routines. This API provides a number of standardized calls that can be utilized by the measurement level software to operate the physics level devices and software. When a module is altered, at most, the API calls that interact with that module need to be updated.

The third major layer will be referred to as the presentation layer in the following discussion. Many of the tests that are performed using a test instrument involve making a number of different measurements and then combining data from the different measurements to arrive at the quantity of interest. For example, a network analyzer is often used to characterize a DUT in terms of the S parameters that characterize that DUT. To arrive at values for each S parameter as a function of frequency, the response of the DUT must be measured as a function of frequency as well as the response of the system with the DUT replaced by certain calibration devices. The results obtained with the calibration devices are then combined with the results obtained with the DUT to arrive at the S parameters. The software in the measurement layer performs this type of computation and utilizes the presentation layer to display or transmit the results in a manner that is more useful to the user than the measurements provided by the measurement layer routines.

The software in the presentation layer is preferably constructed such that the presentation software does not depend on a detailed knowledge of the function calls, algorithmic sequences and specific calculations, and organization of the software in the measurement layer. This allows the presentation software to be used with a variety of instrumentation platforms without having to substantially modify the software when moving from platform to platform. In addition, third party software can be more easily adapted for use in the presentation layer if this level of independence is maintained. To provide the desired level of independence, a second application program interface (API) is provided between the presentation layer and the measurement layer routines. This API provides a number of standardized calls that can be utilized by the presentation level software to access and control the measurement level software.

In some situations, it would be advantageous for third parties to have access to the APIs discussed above to facilitate the development of additional software that can be run on a given instrument. In other situations, it would be advantageous for third parties to substitute their software for pre-existing default measurement software. In addition, it would also be advantageous to control the level of access given to outsiders with respect to the APIs so that separate charges could be made for accessing particular features. However, the APIs discussed above are often proprietary to a particular instrument manufacturer and may include trade secrets or other proprietary information that the manufacturer does not wish to reveal to outsiders. Also, the APIs discussed above may vary between the product lines of a manufacturer. In addition, the APIs do not provide a method for limiting a user to a particular subset of the function calls in the API. Hence, many of the advantages of allowing third parties to have access to the APIs have not been fully realized.

SUMMARY OF THE INVENTION

The present invention includes a test instrument and method for operating the same. The test instrument includes a data processor and a data acquisition system. The data acquisition system includes circuitry that generates signals and couples the signals to a device external to the test instrument and circuitry that receives signals from the device and converts the signals to measurement digital data that is processed by the data processing system. The data processor includes measurement specific software that generates measurements from or calculates desired values for the digital data, a restricted software application that utilizes the measurement digital data, and a physics API that interfaces the measurement specific software with the data acquisition system. The physics API provides a plurality of internal physics functions that are used by the measurement specific software to access the measurement digital data. The test instrument also includes a first external API that maps the physics functions to an external set of physics functions that are available to the restricted software application. The internal physics functions are hidden by the first external API from the restricted software while providing the restricted software with access to at least a portion of the measurement digital data. In one aspect of the invention, the external set of physics functions further includes a function that controls circuitry in the data acquisition system. In another aspect of the invention, the external set of physics functions includes a function that is not operative without a software key being installed in the test instrument. In yet another aspect of the invention, the data processor includes measurement software that combines the measurements to provide test specific data that is displayed by the data processor and a measurement API that interfaces the measurement specific software with the presentation software, the measurement API providing a plurality of internal measurement functions that are used by the presentation software to access the measurements. The test instrument also includes a second external API that maps internal measurement functions to an external set of measurement functions that are available to the restricted software application, the internal measurement functions being hidden by the second external API from the restricted software while providing the restricted software with access to at least a portion of the measurements.

DETAILED DESCRIPTION OF THE PREFERRED EMBODIMENTS OF THE INVENTION

Figure 1:
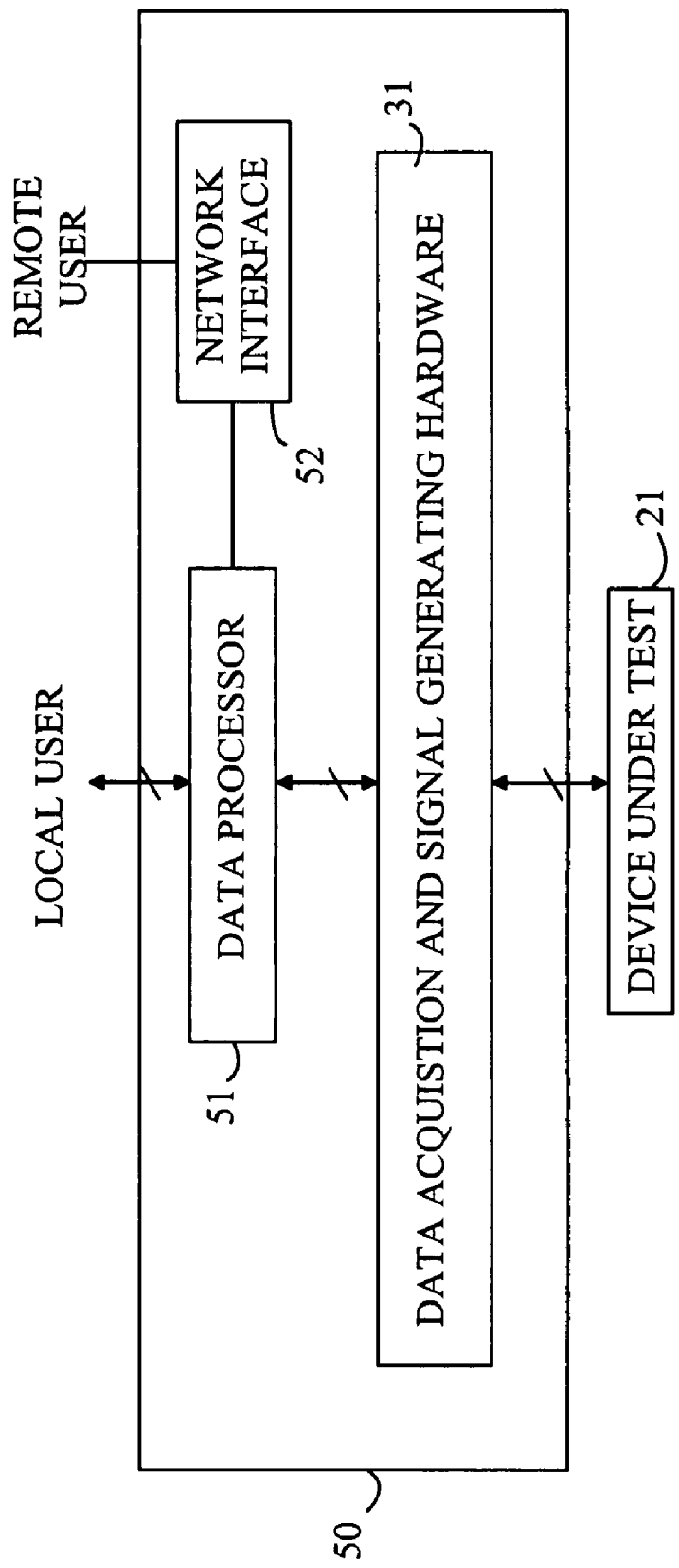
FIG. 1 illustrates the hardware components associated with a test instrument 50.

The manner in which the present invention provides its advantages can be more easily understood with reference to FIG. 1, which illustrates the hardware components associated with a test instrument 50. Test instrument 50 includes hardware 31 that generates signals that are applied to a device under test 21 in response to commands from data processor 51. Data processor 51 is typically a general purpose computer. Hardware 31 also receives signals from the device under test and converts those signals to digital signals that are received by data processor 51 and used to generate the desired test measurements. Hardware 31 typically includes signal-conditioning modules such as amplifiers and drivers, analog-to-digital converters and digital-to-analog converters. In addition, hardware 31 may include special purpose hardware such as field programmable gate arrays (FPGAs) and digital signal processors (DSPs) that provide specialized high speed data processing functions that are not easily implemented in a general purpose data processor. Test instrument 50 also includes a user interface that provides a communication interface with a local user and can include data displays and data input functions. Test instrument 50 also includes a network interface 52 that provides access to test instrument 50 over a computer network such that a remote user can access data processor 51.

Figure 2:
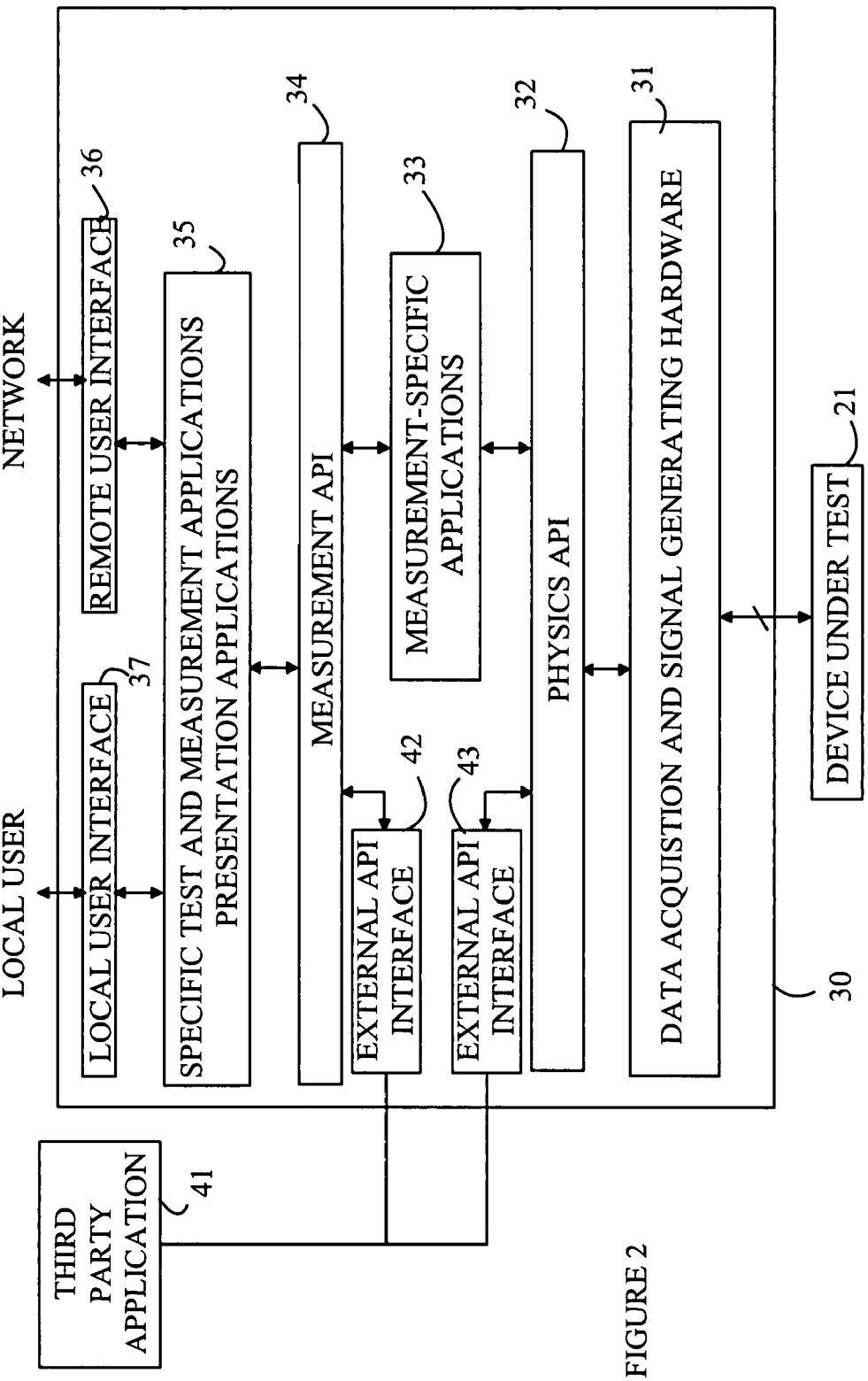
FIG. 2 illustrates one embodiment of a software arrangement according to the present invention that can be utilized in an instrument such as instrument 50.

Refer now to FIG. 2, which illustrates one embodiment of a software arrangement 30 according to the present invention that can be utilized in an instrument such as instrument 50. The instrument is assumed to make measurements of device under test 21 by applying signals to device 21 and receiving signals generated by device 21 and various calibration systems. As noted above, the signal generating and conditioning hardware 31 includes various modules that are controlled by digital commands that are generated in a set of measurement specific applications 33 that communicate with hardware 31 via physics API 32. The measurement specific applications operate the low-level hardware devices to provide one or more specific types of measurements. For example, if the instrument is configured to be a network analyzer, one of the measurement-specific applications would cause hardware 31 to measure the amplitude and phase of a signal from DUT 21 as a function of frequency for various frequencies in a predetermined frequency range.

Physics API 32 provides a set of function calls that operate hardware 31 such that data is sent to hardware 31 and data is returned therefrom. The function calls provide a standardized set of high level calls that simplify the writing of the applications. The function calls translate certain common operations into commands for the individual modules in hardware 31. If a module in hardware 31 is replaced by a new version of that module, in general, only the alterations in the API routines needed to run the new module need to be altered for the instrument to continue to function in the desired manner. Hence, minimal changes, if any, are required in the measurement specific applications. Hence, physics API 32 substantially reduces the work needed to write new applications and maintain the system as new hardware is added or old hardware is replaced.

For the purposes of the present discussion, an API will be defined to be a software interface between first and second sets of software applications. The API includes a set of routines that provide a set of calls that enable the first set of applications to communicate with the second set of applications and receive information from the second set of applications while hiding all of the details of the second set of applications other than those revealed by the syntax of the calls in question. A routine in the API may be merely a mapping of a function available to an application in the first set to a corresponding function in the second set. A routine in the API may also be a complex program that translates a request from the first set of software applications into a number of coordinated calls to functions within the second set of software applications. The API may also allow subscriptions to asynchronous notifications, such as data availability or physics system events.

Instrument 30 also includes a set of test-specific applications and presentation applications 35 that communicate with measurement specific applications 33 via a measurement API 34. As noted above, the tests that a user wishes to perform can involve a complex set of individual measurements that must be combined to provide a display or report of the desired test results. The applications shown at 35 perform these functions and communicate with either a local user via interface 37 or a remote user via interface 36. Measurement API 34 serves a function analogous to that of physics API 32 in that it provides a set of high level calls that relate to specific measurements that are included in the measurement specific applications that can be used to perform a simple or multi-measurement test and display the results while hiding the underlying details of the measurement-specific applications.

In some applications a third party vendor, i.e., a party other than the instrument manufacturer, may wish to utilize the instrument in a manner that requires the integration of a new application either at the measurement specific level of the instrument or the test and measurement level. If the third party had access to the relevant APIs within the instrument, the third party could construct the application in question and integrate it into the instrument. Such an arrangement could be advantageous to both the instrument manufacturer and the third party in that the instrument manufacturer could sell additional instruments or charge users for the upgrade of the instrument, and the third party could sell the new application to current user's of the instrument. In addition, the instrument manufacturer might wish to have an outside vendor develop a new application for the instrument that would be sold and serviced by the instrument manufacturer under the instrument manufacturer's brand name. In addition, an end user may need to develop a measurement without sharing the specific details and specifications of the measurement with the instrument manufacturer to allow the manufacturer to develop the capability of providing the measurement in the instrument.

Unfortunately, to enable such arrangements using prior art instrument designs, the instrument manufacturer would need to provide the third party with a list of the function calls in the relevant API and the syntax for using those calls. The measurement API and physics API are proprietary interfaces. While the specific calls in each interface hide much of the underlying functionality, the syntax of the calls does provide information that the manufacturer may not wish to reveal to competitors. In addition, the manufacturer might wish to make only a subset of the API calls available to third parties, the specific subset depending on the particular third party vendor in question.

In addition, the manufacturer might wish to charge an existing user of the instrument for the improvements provided by the third party application 41. If the third party application uses the same API calls, the instrument manufacturer would need to provide some mechanism for distinguishing API calls that originate in the third party application from calls that originate in the internal software applications provided by the manufacturer. Hence, a mechanism is needed that provides the ease of use of the APIs while hiding as much of the underlying details as possible and allowing the instrument manufacturer to regulate the extent to which an outside vendor can utilize the APIs.

The present invention provides this mechanism by including two external API interfaces shown at 42 and 43. Each external API maps a set of external API calls to the corresponding set of internal API calls implemented in the API to which it is connected. External API 42 maps a set of external measurement API calls to the API calls implemented in measurement API 34, and external API 43 maps a set of external physics API calls to the API calls implemented in physics API 32. Hence, an external application 41 can make use of the measurement specific applications or directly operate hardware 31 to provide a new test or measurement.

In one embodiment, each of the external APIs require one or more activation keys to be downloaded in order to enable the external API in question to operate. The key can be downloaded through either the local user interface or the remote user interface. Different keys can unlock different features of the external APIs. For example, each external API can have its own set of keys. Hence, external applications that make use of the measurement-specific applications can be priced at a different level than applications that only make use of the lower level physics API routines. In addition, for any given external API, a key can be provided that only unlocks a particular subset of the external API calls. Hence, the external application can be limited without altering the level of access provided to the internal applications in the instrument. In another embodiment, access to the external API calls is provided via a remote communication mechanism (such as a LAN) so that the external application need not reside within the instrument.

Various modifications to the present invention will become apparent to those skilled in the art from the foregoing description and accompanying drawings. Accordingly, the present invention is to be limited solely by the scope of the following claims.

What is claimed is:

1. An apparatus comprising a data processor and a data acquisition system,
    said data acquisition system comprising first circuitry that generates signals and couples said signals to a device external to said apparatus and second circuitry that receives signals from said device and converts said signals to measurement digital data that is processed by said data processor,
    said data processor comprising measurement specific software that generates measurements from said digital data;
    a physics API that interfaces said measurement specific software with said data acquisition system, said physics API providing a plurality of internal physics functions that are used by said measurement specific software to access said measurement digital data; and
    a first external API that maps said physics functions to an external set of physics functions that are made available to a restricted software application that utilizes at least a portion of said measurement digital data, said internal physics functions being hidden by said first external API from said restricted software while providing said restricted software with access to at least a portion of said measurement digital data.

2. The apparatus of claim 1 wherein said external set of physics functions comprises a function that controls circuitry in said data acquisition system.

3. The apparatus of claim 1 wherein said external set of physics functions comprises a function that is not operative without a software key being installed in said apparatus.

4. The apparatus of claim 1 wherein said data processor further comprises presentation software that combines said measurements to provide test specific data that is displayed by said data processor;
    a measurement API that interfaces said measurement specific software with said presentation software, said measurement API providing a plurality of internal measurement functions that are used by said presentation software to access said measurements; and
    a second external API that maps internal measurement functions to an external set of measurement functions that are available to said restricted software application, said internal measurement functions being hidden by said second external API from said restricted software while providing said restricted software with access to at least a portion of said measurements.

5. The apparatus of claim 4 wherein said second external API also maps internal presentation functions to an external set of presentation functions that are available to said restricted software application, said internal presentation functions being hidden by said second external API from said restricted software while providing said restricted software with access to at least a portion of said presentation functions.

6. A method for operating an instrument comprising a data processor and a data acquisition system, said data acquisition system comprising a circuitry that generates signals and couples said signals to a device external to said instrument and circuitry that receives signals from said device and converts said signals to measurement digital data that is processed by said data processor, said method comprising:
- providing measurement specific software that generates measurements from said digital data;
- providing a restricted software interface for executing a restricted software application that utilizes said measurement digital data; and
- providing a physics API that interfaces said measurement specific software with said data acquisition system, said physics API providing a plurality of internal physics functions that are used by said measurement specific software to access said measurement digital data, wherein said restricted software interface comprises a first external API that maps said physics functions to an external set of physics functions that are available to said restricted software application, said internal physics functions being hidden by said first external API from said restricted software while providing said restricted software with access to at least a portion of said measurement digital data.

7. The method of claim 6 wherein said external set of physics functions further comprises a function that controls circuitry in said data acquisition system.

8. The method of claim 6 wherein said external set of physics functions comprises a function that is not operative without a software key being installed in said instrument.

9. The method of claim 6 wherein said data processor further comprises presentation software that combines said measurements to provide test specific data that is displayed by said data processor; and
- a measurement API that interfaces said measurement specific software with said presentation software, said measurement API providing a plurality of internal measurement functions that are used by said presentation software to access said measurements, wherein said restricted software interface further comprises a second external API that maps said internal measurement functions to an external set of measurement functions that are available to said restricted software application, said internal measurement functions being hidden by said second external API from said restricted software while providing said restricted software with access to at least a portion of said measurements.

* * * * *